US005373285A

United States Patent [19]

Aslan

[11] Patent Number: 5,373,285

[45] Date of Patent: Dec. 13, 1994

[54] PERSONAL ELECTROMAGNETIC RADIATION MONITOR

[75] Inventor: Edward E. Aslan, Plainview, N.Y.

[73] Assignee: The Narda Microwave Corp., Hauppauge, N.Y.

[21] Appl. No.: 134,977

[22] Filed: Oct. 12, 1993

Related U.S. Application Data

[63] Continuation-in-part of Ser. No. 62,474, May 14, 1993.

[51] Int. Cl.[5] .............................................. G05B 21/00

[52] U.S. Cl. ................................ 340/600; 250/336.1; 250/395; 250/526

[58] Field of Search ...................... 340/600; 250/336.1, 250/526, 395

[56] References Cited

U.S. PATENT DOCUMENTS

| | | | |
|---|---|---|---|
| 4,301,367 | 11/1981 | Hsu | 250/370 |
| 4,368,472 | 1/1983 | Gandhi | 343/718 |
| 4,489,315 | 12/1984 | Falk et al. | 340/600 |
| 4,605,905 | 8/1986 | Aslan | 330/9 |
| 5,168,265 | 12/1992 | Aslan | 340/600 |

FOREIGN PATENT DOCUMENTS 2194865 3/1988 United Kingdom .

*Primary Examiner*—Glen Swann
*Attorney, Agent, or Firm*—Hoffmann & Baron

[57] ABSTRACT

A personal electromagnetic radiation monitor includes an electromagnetic radiation sensor in the form of at least one coil mounted on a rectangular form of lossy material. A first metal shield plate is situated adjacent to one side of the form on which the coil is mounted, and a second metal shield plate is situated on another side of the form. The metal shield plates have an impedance which varies substantially inversely proportional with the frequency of electromagnetic radiation sensed by the coil, and compensate for the variation in the magnitude of the induced current in the coil, which induced current, without at least one of the shields, would have varied in magnitude substantially directly proportional with the frequency of the electric field component of the electromagnetic radiation, so that the magnitude of an output signal generated by the sensor is relatively independent of the frequency of the sensed electromagnetic radiation.

2 Claims, 8 Drawing Sheets

PERSONAL ELECTROMAGNETIC RADIATION MONITOR

CROSS REFERENCE TO RELATED APPLICATIONS

This application is a continuation-in-part of U.S. patent application Ser. No. 08/062,474, filed May 14, 1993.

BACKGROUND OF THE INVENTION

1. Field of the Invention

This invention relates to radiation monitors, and more specifically relates to an electromagnetic radiation monitor which may be worn by persons who may be exposed to potentially harmful levels of electromagnetic energy. Even more particularly, this invention relates to a personal electromagnetic radiation monitor for use in the VHF RF region and which operates substantially independently of polarization.

2. Description of the Prior Art

Attempts have been made to make an electromagnetic radiation monitor which may be worn by a person working in areas where potentially harmful electromagnetic radiation may be present. Early studies, such as those reported by Beischer in his article *Microwave Reflection, Diffraction and Transmission By Man*, Department of Naval Aerospace Medical Research Lab, Pensacola, Fla., June, 1973, have shown that scattering from a body may produce errors greater than 2 dB. This scattering becomes more significant where broadband frequency performance and independence of polarization are desired monitor characteristics.

U.S. Pat. No. 5,168,265, which issued to Edward E. Aslan, also the inventor herein, discloses a radiation monitor which is independent of polarization and preferably operable between about 2 GHz and about 18 GHz. The radiation monitor senses the electric field component of the electromagnetic radiation and employs thin film resistive thermocouples for this purpose. The radiation monitor disclosed in the Aslan patent mentioned above does not measure electromagnetic radiation in the lower frequency region, that is, well below 2 GHz.

The 1982 American National Standards Institute (ANSI) C95 standard and the Institute of Electronic and Electrical Engineers (IEEE) C95.1 1991 standard require that both the magnetic and the electric fields be measured below 30 MHz, but for frequencies between 30 and 300 MHz, it may be possible through analysis to show that measurement of only one of the two fields, not both, is sufficient for determining compliance with the maximum permissible exposure level.

This frequency range should be monitored, as it coincides with the human resonance region of 30 MHz to 300 MHz where energy absorption in the body is a maximum from both the electric and the magnetic fields. The equivalent power density protection guide in this region is 1 $mW/cm^2$ or 61.4 volts/meter and 0.163 amp/meter in field strength.

To this date, no practical device being independent of polarization and being responsive to electromagnetic radiation in the VHF RF region, that is, 30 MHz to 1000 MHz, to the knowledge of the inventor, has been successfully marketed.

OBJECTS AND SUMMARY OF THE INVENTION

It is an object of the present invention to provide an electromagnetic radiation monitor which may be worn by persons who may be exposed to potentially harmful levels of electromagnetic energy.

It is another object of the present invention to provide a personal electromagnetic radiation monitor which is responsive to electromagnetic radiation in the VHF RF frequency region, and is substantially independent of polarization.

It is a further object of the present invention to provide an unobtrusive, pocket-size personal electromagnetic radiation monitor which accurately detects RF radiation and sends out a warning the moment it senses that the wearer moves into a danger zone.

It is yet another object of the present invention to provide a personal electromagnetic radiation monitor which employs an electromagnetic radiation sensor assembly which generates a substantially flat response to sensed electromagnetic radiation over frequency.

It is a further object of the present invention to provide a method for compensating a electromagnetic radiation sensor used in a radiation monitor for the undesirable effects the radiation may have on the sensor.

It is still a further object of the present invention to provide an electromagnetic radiation sensor for use in a radiation monitor, which sensor is operable in the VHF RF frequency region.

It is yet a further object of the present invention to provide a personal electromagnetic radiation monitor which complies with the ANSI and IEEE standards for detecting electromagnetic radiation.

It is still a further object of the present invention to provide a personal electromagnetic radiation monitor whose performance is substantially unaffected due to scattering when worn by a person.

In accordance with one form of the present invention, a personal electromagnetic radiation monitor includes an electromagnetic radiation sensor assembly, a detector circuit coupled to the sensor and associated electronic circuitry coupled to the detector circuit which will compare a signal proportional to the sensed electromagnetic radiation with a predetermined threshold and trigger an alarm to warn the wearer of exposure to a dangerous level of electromagnetic radiation.

In a preferred form of the invention, the electromagnetic radiation sensor of the monitor includes two mutually perpendicularly disposed coils wound on a styrofoam form. The form is preferably rectangular in shape. In another preferred embodiment, the form may be made from a lossy material, instead of the styrofoam, and the coils may be formed from a flat ribbon wire. The sensor (i.e., the coils and form) have a front surface facing away from the electronic circuitry and an opposite back surface facing the electronic circuitry of the radiation monitor.

The electromagnetic radiation sensor assembly preferably includes the sensor having the two perpendicularly disposed coils described above supported on either the styrofoam or lossy material form, and further having front and back shield plates or foils respectively disposed adjacent to the front and back surfaces of the sensor. The higher the frequency of the electromagnetic radiation, the more responsive to the electric field component of the electromagnetic radiation the coils will be. Thus, the response of the coils will increase substantially linearly with the frequency of the sensed radiation. To compensate for this effect, the front and back shield plates are provided which act as imperfect shorts. As frequency increases, the effective impedance of the shields decreases linearly to short out more of the electric field. As a result, the response of the sensor assembly to electromagnetic radiation remains substantially constant over frequency.

As an alternative, the front shield plate may take the form of crossed dipoles, one dipole preferably being situated in proximity to each coil.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 1:
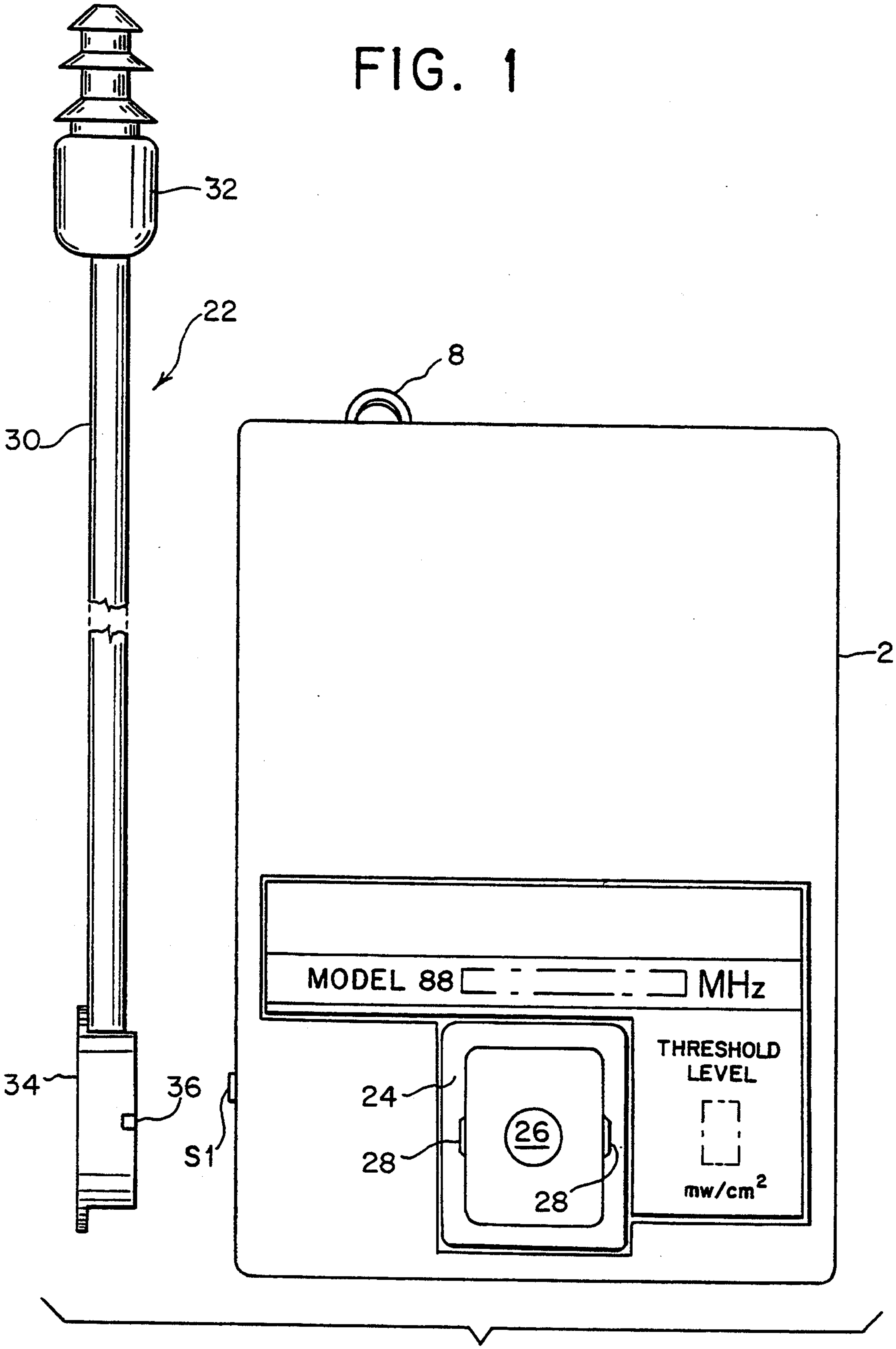
FIG. 1 is a front view of a personal electromagnetic radiation monitor formed in accordance with the present invention.
Figure 3:
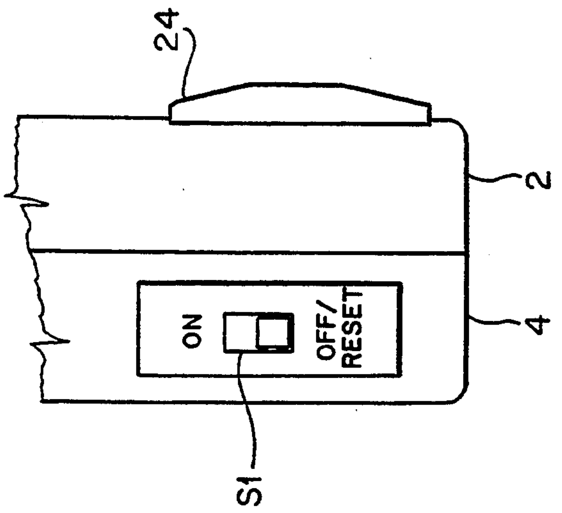
FIG. 3 is a side view of a portion of the radiation monitor of the present invention.

Referring initially to FIGS. 1–4 of the drawings, it will be seen that a personal electromagnetic radiation monitor constructed in accordance with one form of the present invention includes a two-piece housing having a front half 2 and a back half 4 which are mateable together. The front half 2 of the housing has mounted on it an audible alarm transducer 6, such a piezo ceramic transducer, which, as will be explained, provides a warning of high level RF radiation or that the battery used in the monitor is at a low voltage. During an initial turn-on test, the audible alarm 6 preferably provides a one second sound burst. Above a preset threshold of the detected RF energy, the alarm 6 provides a periodic nominal one second sound burst with the repetition rate increasing with the level of exposure. When the monitor battery is at a low voltage, the alarm provides an audible chirp every 40 seconds to a continuous warble (as the battery voltage drops). If the battery voltage is so low that the electromagnetic radiation sensor used in the monitor fails, the audible alarm 6 provides a continuous tone.

The personal electromagnetic radiation monitor of the present invention further includes a visual display in the form of a light emitting diode (LED) 8. The LED 8 is mounted on the upper wall of the back housing half 4. During an initial turn-on test, the circuitry included in the monitor will illuminate the LED. When a predetermined amount of RF energy is detected by the monitor, the electronic circuitry will cause the LED 8 to light and the audible alarm 6 to beep, indicating a need for the wearer of the monitor to leave the area promptly.

The monitor further includes an on/off switch S1 mounted on a side wall of the back half 4 of the housing, as well as a resilient clip 10 mounted on the back half of the housing to allow the monitor to be carried by the wearer on his belt or shirt pocket.

Figure 2:
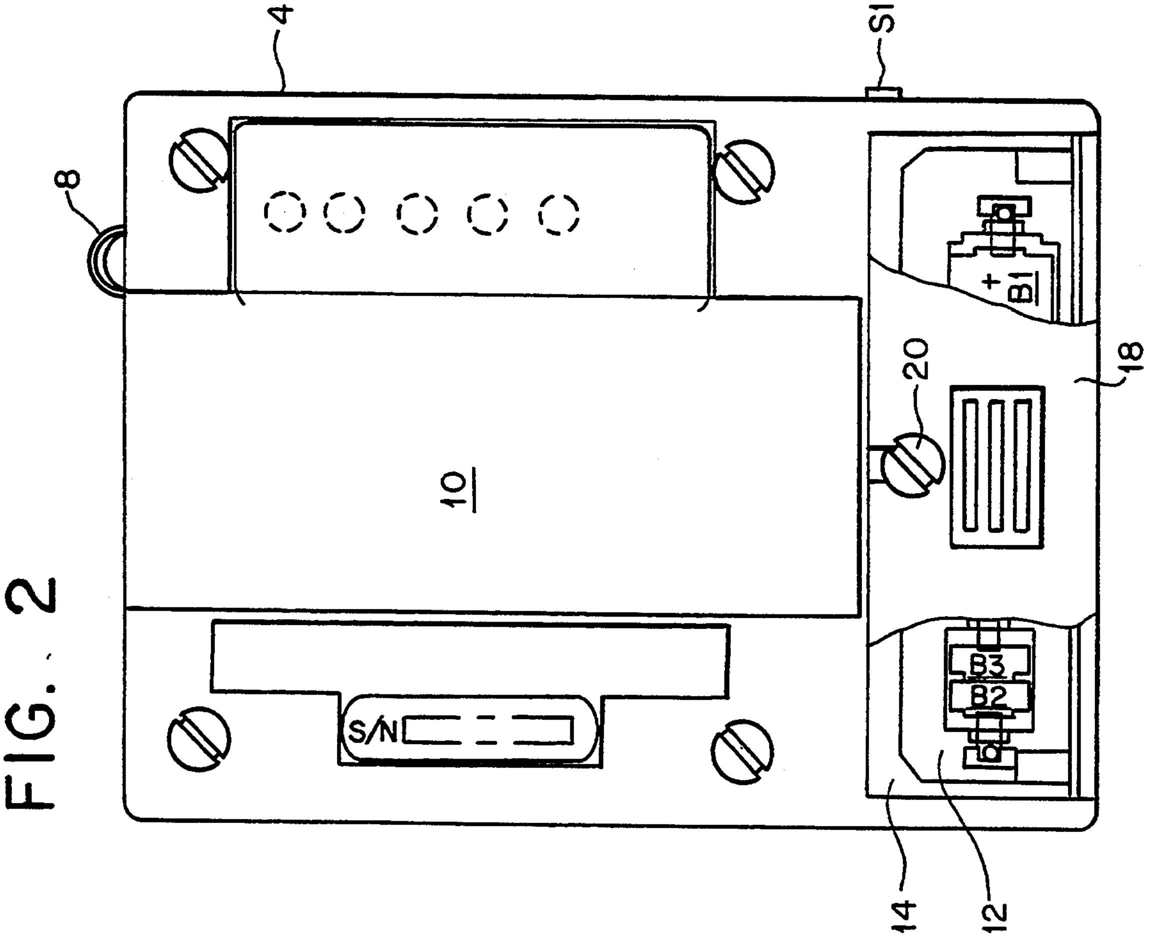
FIG. 2 is a rear view of the radiation monitor of the present invention, showing the battery compartment cover partially broken away.
Figure 4:
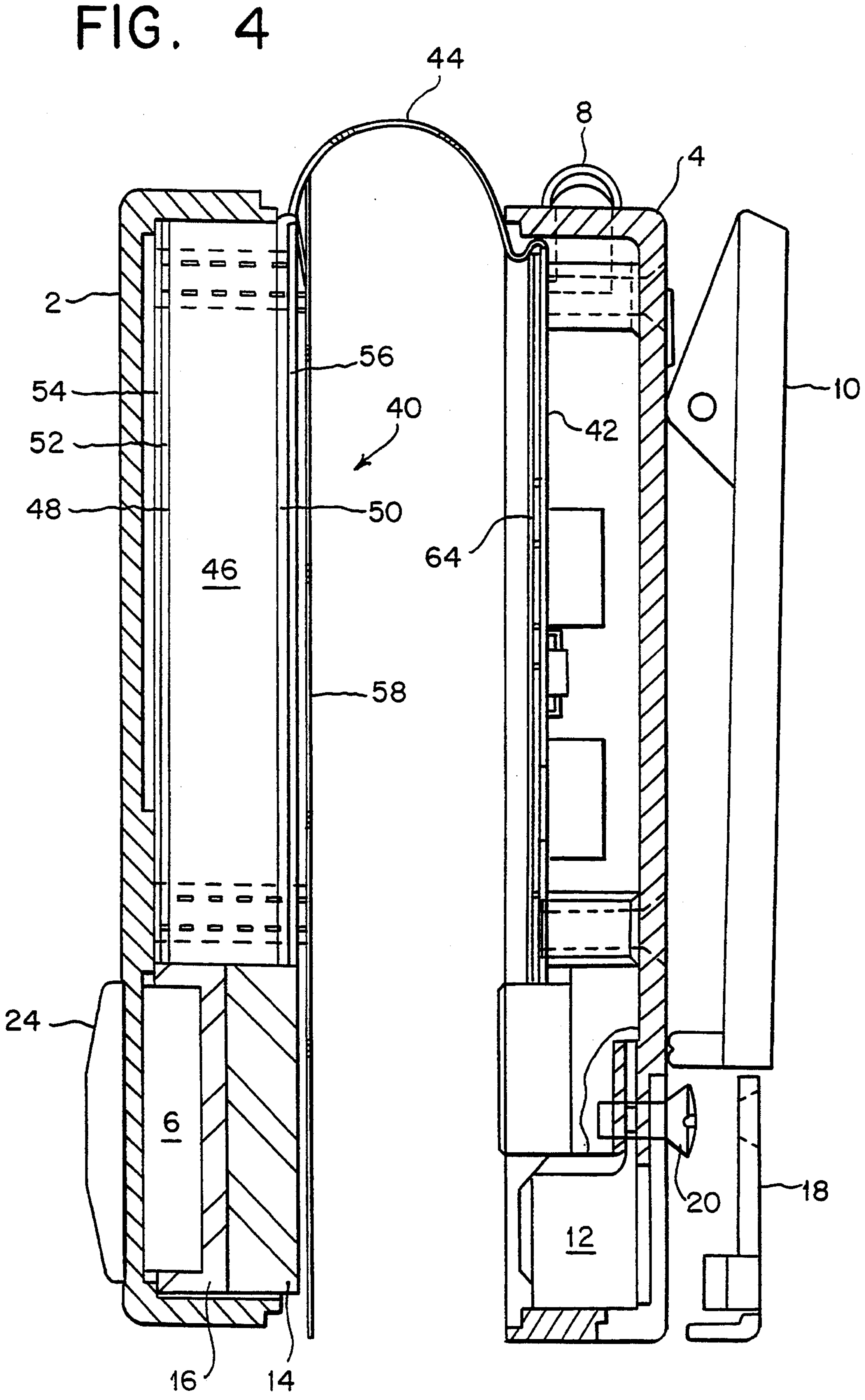
FIG. 4 is a partially exploded side view of the monitor shown in FIG. 1, formed in accordance with one form of the present invention.

As shown in FIGS. 2 and 4 of the drawings, the mated housing halves define a battery compartment 12 which houses a 12 volt alkaline battery B1 and two 1.5 volt button batteries B2, B3 connected in series. To insure that no RF energy affects the performance of the monitor, the battery compartment 12 which houses batteries B1–B3 is at least partially lined with a lossy material 14 so that the batteries are at least partially surrounded by the material, and the transducer 6, as well, is at least partially surrounded by an absorbent or lossy material 16. The battery compartment 12 has an opening formed in the back housing half 4, which opening is covered by a battery compartment cover 18, which cover is held in place by a screw 20.

The radiation monitor of the present invention also includes an ear plug assembly 22, as shown in FIG. 1 of the drawings, so that the monitor may be used in high noise environments. A multi-sided wall 24 extends outwardly from the outside surface of the front housing half 2 and situated to surround an opening 26 formed in the front wall of the housing half and aligned with the transducer 6. The wall 24 includes one or more detents 28 formed in its inner surface. The ear plug assembly 22 includes an elongated hollow tube 30. A pneumatic ear piece or ear plug 32 is mounted on one end of the tube 30, and a hollow housing 34 defining an interior cavity is mounted on the other end. The hollow housing 34 has an opening formed through its thickness, and includes one or more outwardly extending protrusions 36 which are adapted to mate with the detents 28 formed in the wall 24 of the monitor housing to hold the ear plug housing in place when it is received within the interior area defined by the multi-sided wall 24. This will allow the ear plug housing 34 to be mounted adjacent to the transducer 6 so that the tone emitted by the transducer will be carried by air pressure through the tube to the pneumatic ear plug 32.

Another suitable ear plug which may be used in conjunction with the personal radiation monitor of the present invention is disclosed in U.S. Pat. No. 5,168,265, which issued to Edward E. Aslan, the inventor herein, the disclosure of which is incorporated herein by reference.

The ear plug assembly 22 is advantageous in that it is completely electrically non-conductive. Therefore, the ear plug assembly will not pick up RF energy which might have otherwise affected the electronic circuitry of the monitor, as a conventional electrical transducer would, and further provides a safety feature in that the user of the monitor does not wear an electrically conductive device on his head, to prevent electrical shock and to prevent RF energy from being picked up by the ear plug assembly 22 and being radiated to the wearer's head.

Figure 9:
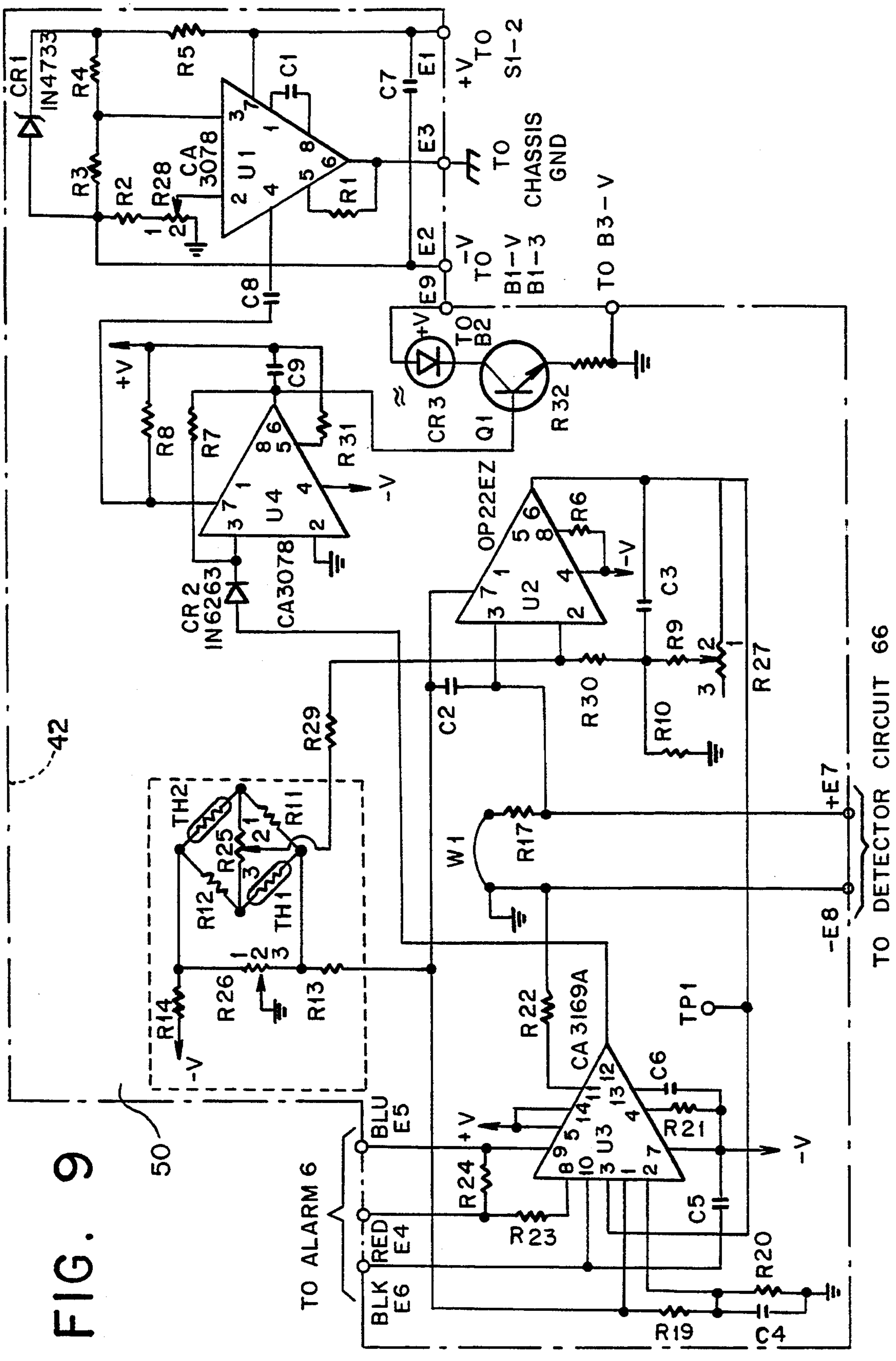
FIG. 9 is a schematic diagram of a third portion of an electronic circuit used in conjunction with the monitor of the present invention.

Referring now to FIG. 4 of the drawings, it will be seen that the personal radiation monitor of the present invention includes an electromagnetic radiation sensor assembly 40 situated in the front half 2 of the housing, and a printed circuit board 42 containing the electronic circuitry for the monitor situated in the back half 4 of the housing. The sensor assembly 40, which preferably has mounted with it the detector circuitry shown in FIG. 7, as will be described, is electrically coupled to the electronic circuitry of the main printed circuit board 42, which electronic circuitry is shown in FIG. 9, by a flexible transmission line 44 consisting of at least two leads of carbon impregnated TFE material. The leads have a resistance of approximately 10,000 ohms per inch.

In one form of the present invention, the radiation sensor includes two mutually perpendicularly disposed wire coils L1, L2 (FIG. 5) of two turns each wound on a preferably rectangular shaped styrofoam form 46. The assembly (i.e., the wire loop coils L1, L2 and the foam form 46) has a front face 48 facing the front wall of the front housing half 2, and an opposite rear face 50 facing the printed circuit board 42 containing the electronic circuitry. A first insulator sheet 52, such as formed from a sheet of Mylar (TM), is situated adjacent to the front face 48 of the sensor assembly 40. A first shield 54 preferably made of a conductive material and formed as a metal plate or foil, such as from aluminum, is positioned adjacent to the first insulator 52, and therefore in front of the front face 48 of the sensor assembly. A second insulator sheet 56, which may also be made of a Mylar (TM) material, is positioned adjacent to the back face 50 of the sensor assembly, and a second shield 58, i.e., a ground shield, is positioned adjacent to the second insulator 56 and behind the sensor assembly as a whole. The second ground shield 58 may be formed of the same material and have the same structure as that of the first shield 54.

The combination of the first and second shields 54, 58 situated in front of and behind the sensor assembly 40 and the use of perpendicular coils L1, L2 provide the radiation monitor of the present invention with the capability of monitoring electromagnetic radiation in the frequency range of between about 30 to about 1,000 MHz. Effectively, the magnetic field component of the radiation is monitored below a transition point, which occurs about 200 MHz, and the electric field component is monitored above the transition point, as will be explained.

When the diameter of each coil loop L1, L2 is small relative to a wavelength of the sensed electromagnetic radiation (i.e., the frequency of the radiation is relatively low), the electric field induced currents in opposite sides of each loop coil will be equal in magnitude and phase. As a result, the electric field induced currents will cancel and the loops L1, L2 will provide no response to the electric field.

As the frequency of the electromagnetic radiation increases and the loop diameter becomes significant with respect to the wavelength of the radiation, both phase and magnitude of the electric field induced currents in opposite sides of each loop coil L1, L2 are appreciably different, resulting in a total current signal that is proportional to the frequency of the electric field. The diameter of each loop coil L1, L2 mounted on the styrofoam form 46 is selected to provide increasing response to the electric field above 200 MHz, i.e., the transition point between sensing the magnetic field and sensing the electric field. This is not only in accordance with the ANSI and IEEE standards, as described previously, where one of the magnetic and electric fields may be measured below 300 MHz, but also follows good measurement practice which dictates that the monitoring of the magnetic field in the low frequency region is more precise. Electric fields will be greatly perturbed and/or shorted by material objects both dielectric and conductive in the lower portion of VHF RF region.

As mentioned previously, as the frequency of the electromagnetic radiation increases, the total current response of each loop sensor L1, L2 is proportional to the magnitude of the electric field and increases substantially linearly with frequency. This increase in magnitude of the response signal of each coil is compensated for by the conductive shield plates 54, 58 placed in front of and behind the loops L1, L2. Each conductive shield plate acts as an imperfect short and shorts some of the electric field. Each shield plate 54, 58 exhibits a lower impedance as frequency increases and the size of each shield plate becomes a larger fraction of the wavelength of the electromagnetic radiation. The impedance of the shield plates 54, 58 varies substantially inversely linearly with frequency. This results in an increased shorting effect on the part of the shield plates, which reduces the resultant total current from each loop L1, L2 so that the total current response signal from each loop is proportional to the magnitude of the electric field and relatively independent of frequency.

Figure 6:
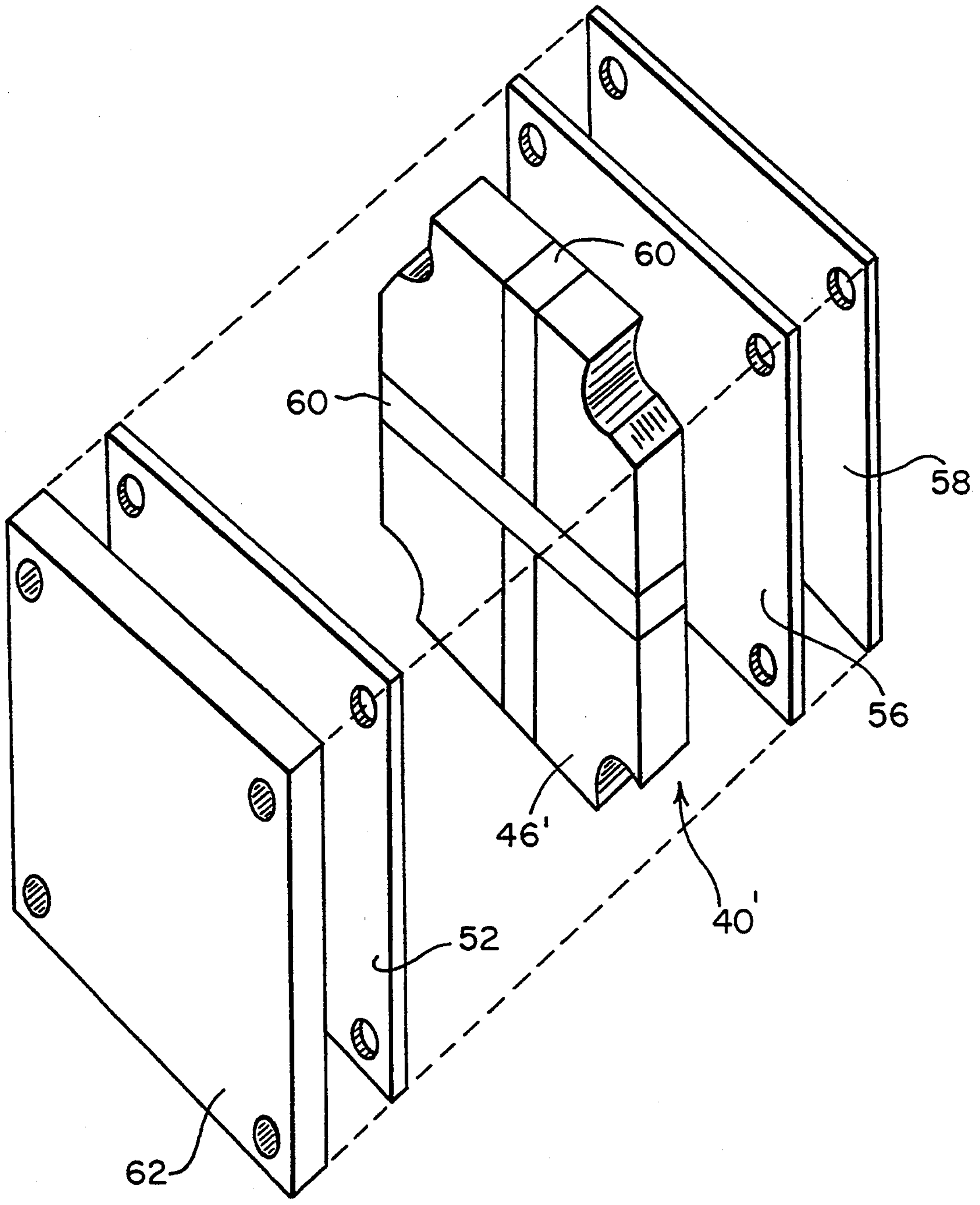
FIG. 6 is an exploded view, in perspective, of a portion of a radiation monitor formed in accordance with other forms of the present invention.

In another form of the present invention as shown in FIG. 6 of the drawings, an absorbent or lossy material 46' may be substituted for the styrofoam material 46 in the previous embodiment and act as the form for the coils. A suitable lossy material 46' which may be used is Part No. LS-24 manufactured by Emerson and Cumming, Inc. of Canton, Mass. The LS-24 material is preferably $\frac{1}{4}$ inch in thickness and has a volume resistivity of 600K ohms/cm.

In yet a further embodiment of the present invention, and as also shown in FIG. 6 of the drawings, the coils L1, L2 may be formed from flat or ribbon wire 60 and each may, if desired, be comprised of a single turn of wire. The single turn of wire coils will effectively provide a range of the sensor to between about 30 MHz and about 1,000 MHz.

In yet another embodiment of the present invention, and as also shown in FIG. 6, the first or front conductive shield 54 may be replaced by an absorbent or lossy material 62. The lossy material 62 acts as an imperfect short, like the conductive shield 54 it replaces, and in conjunction with the second shield plate 58 reduces the resultant total current from the coils L1, L2 so that the signal response from the sensor assembly 40' is proportional to the magnitude of the electric field and relatively independent of frequency. As in the previous embodiment described with respect to FIGS. 1–4, first and second insulators 52, 56 are interposed between the sensor assembly 40' and the front lossy material shield 62 and the rear ground shield plate 58. Alternatively, lossy material may be used as the rear ground shield plate 58 in combination with a front conductive shield 54 made of a metal or lossy material.

Figure 6A:
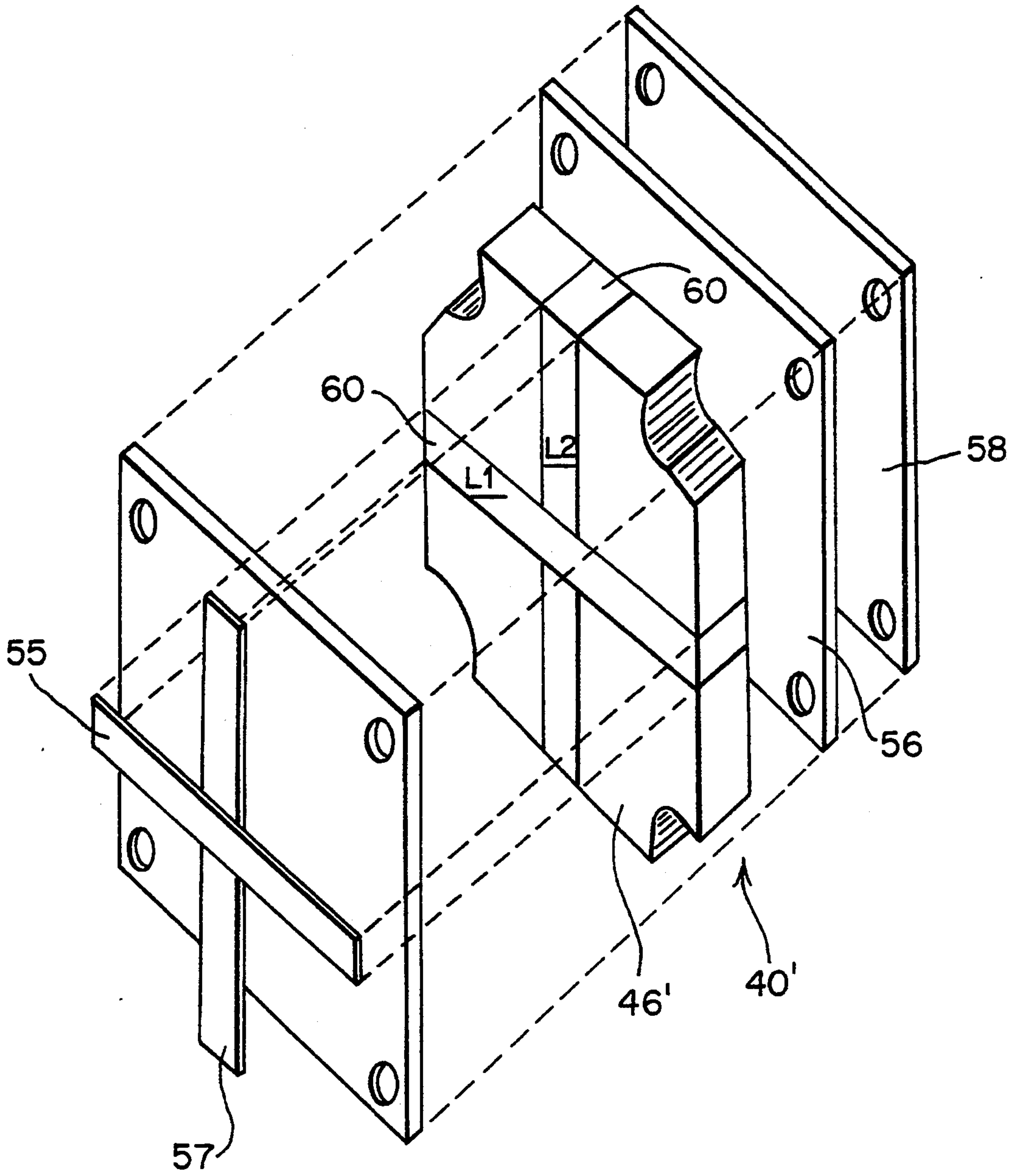
FIG. 6A is an exploded view, in perspective, of a portion of a radiation monitor formed in accordance with an additional form of the present invention.

In one further embodiment of the present invention, and as shown in FIG. 6A, one of the conductive shields 54, 58, and more preferably the first or front conductive shield 54, may be shaped in the form of crossed dipoles 55, 57, each dipole being preferably formed from thin adhesive backed copper foil cut to ¼" width by 2¼" length strips, which strips are orthogonal to each other and crossing each other at their centers. Each dipole 55, 57 is preferably positioned in proximity to and in alignment with a corresponding coil L1, L2 (which coils may be in the form of flat wire 60), with first insulator 52 interposed between the dipoles and the coils.

The crossed dipole arrangement described above shorts out the electric field in much the same way as conductive plate 54, but provides the sensor of the monitor with greater sensitivity at higher frequencies, such as about 900 MHz, to allow the monitor to be operational from about 50 MHz to about 1 GHz. With respect to this embodiment, it should be realized that, if only one coil, L1 or L2, is used for the sensor of the monitor, a single dipole formed from a single copper strip as described above may be used and positioned in alignment with the coil.

Returning again to FIG. 4 of the drawings, the sensor assembly 40, first and second insulators 52, 56 and first and second shield plates 54, 58 are sandwiched together between the mating halves of the housing. To prevent the second ground shield plate 58 from shorting out the circuitry on the main printed circuit board 42, an additional insulator 64 formed as a Mylar (TM) sheet is placed adjacent to the rear side of the printed circuit board 42 and interposed between the printed circuit board and the ground shield plate 58.

Figure 5:
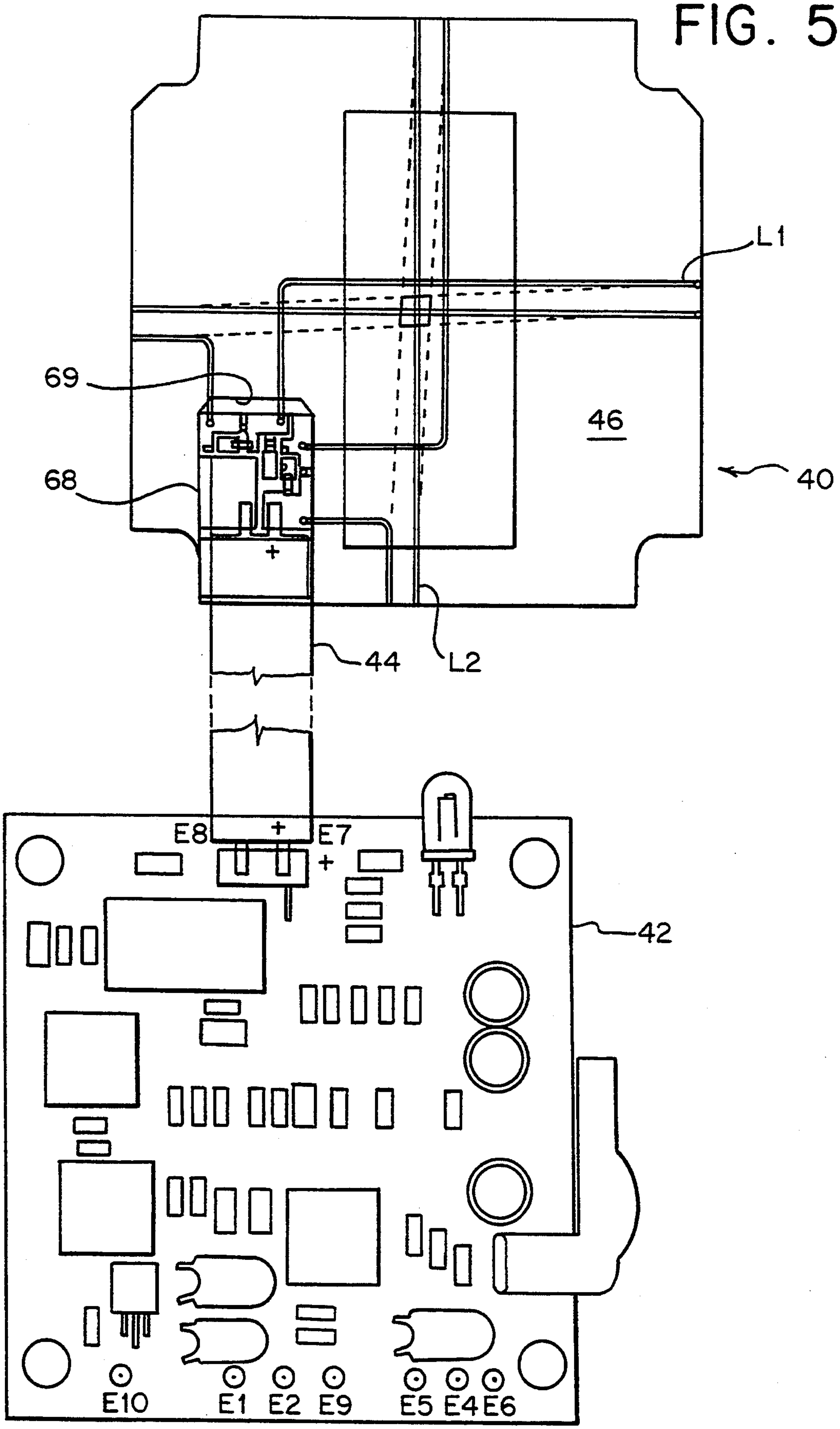
FIG. 5 is a top plan view of a portion of the radiation monitor shown in FIG. 4.

As mentioned previously and as shown in FIG. 7 of the drawings, the two coils L1, L2 of the sensor assembly are connected to a detector circuit 66. The detector circuit is preferably formed as a hybrid circuit where the individual components are dice, and the circuit is mounted on a printed circuit board 68 (FIG. 5). The printed circuit board 68 is preferably housed in a cutout 69 formed in the styrofoam or absorbent material form 46 of the electromagnetic radiation sensor assembly and, therefore, are advantageously located close to the radiation detecting loop coils L1, L2.

The detector circuit 66 basically includes first and second detecting sections 70, 72 coupled together with a resistor R4. Coil L2 is attached across terminals E5 and E6 of the detector printed circuit board and is connected in parallel with a sensing resistor R7 of the first section 70. In parallel with the sensing resistor R7 is a voltage divider network comprising resistors R5 and R9 connected together in series. The current induced in coil L2 induces a voltage across sensing resistor R7, and this voltage is divided by the network having resistors R5 and R9. The voltage divider network is provided to insure that the voltage across the detector diode CR2 is limited so that the diode operates in the square law region.

The cathode of detector diode CR2 is connected to the interconnecting junction between resistors R5 and R9, and the anode of diode CR2 is connected to the negative (−) output terminal E2 of the detector circuit printed circuit board 68.

Capacitor C2 is connected between terminal E6 and terminal E2 and is provided for blocking DC voltages. Resistor R6 is coupled in parallel with diode CR2, and is provided to compensate for temperature.

As the temperature decreases, the impedance of the diode CR2 increases. Therefore, the offset voltage provided to the amplifier to which the detector circuit is coupled, as will be described, increases, due to the bias current of the amplifier being provided to the detector circuit 66 on terminals E1 and E2. To compensate for this variation in the offset voltage due to temperature, resistor R6 is provided across diode CR2 to decrease the effective impedance of the diode with a decrease in temperature so that the change in the effective impedance of the detector circuit at terminals E1 and E2 with respect to temperature variations is minimized.

The second section 72 of the detector circuit comprises resistor R2 coupled in parallel with coil L1 which is connected to terminals E3 and E4. A voltage divider is formed with resistors R1 and R8 connected together in series and in parallel across resistor R2. Diode CR1 has its cathode connected to the junction of resistors R1 and R8. A temperature compensating resistor R3 is connected in parallel with detector diode CR1, and a coupling capacitor C1 has one side connected to terminal E4 and the other side connected to the anode of diode CR1. The positive (+) output terminal E1 of the detector circuit is coupled to coil input terminal E3, and the two detector circuit sections 70, 72 are coupled together by resistor R4 connected between terminal E5 and the anode of diode CR1. The operation of the second detector circuit section 72 is substantially the same as that of the first detector circuit section 70 described previously.

It may be desirable to add capacitors C3 and C4 respectively in parallel with sensing resistors R2 and R7. Capacitors C3 and C4 will provide a roll off in the frequency response of the detector circuit so that the monitor of the present invention conforms with ANSI standards which require that the maximum permissible exposure level increases at a 3 dB/octave rate from 300 MHz to 3 GHz.

Figure 8:
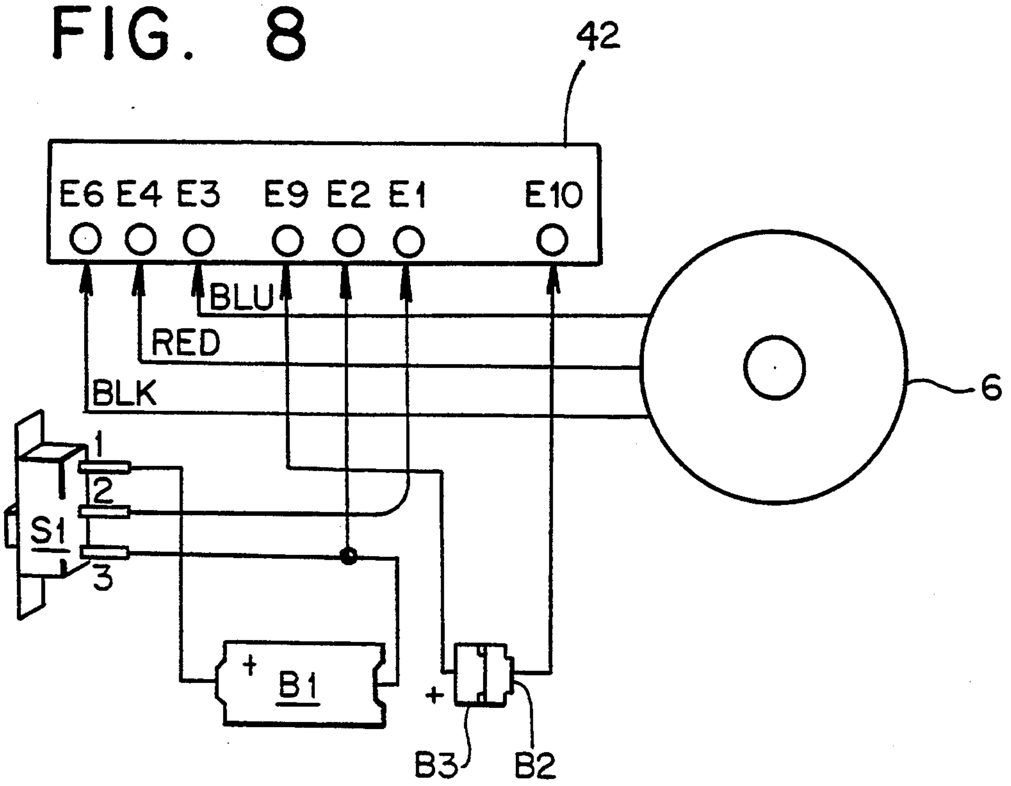
FIG. 8 is a schematic/pictorial diagram of a second portion of an electronic circuit used in conjunction with the monitor of the present invention.

Referring now to FIGS. 5, 8 and 9, it will be seen that the sensor assembly 40, including the detector circuit 66 on the printed circuit board 68, is connected from terminals E1 and E2 on the detector circuit printed circuit board 68 to the rest of the electronic circuitry on the main printed circuit board 42 at terminals E7 and E8, respectively, through the flexible transmission line 44 described previously. The terminal numbers referred to hereinafter relate to the terminal numbers on the main printed circuit board 42 incorporating the electronic circuitry illustrated by FIG. 9 of the drawings.

FIG. 9 illustrates one form of an electronic circuit for use with the radiation monitor. The circuit is essentially the same as that described in U.S. Pat. No. 5,168,265 to Edward Aslan, the inventor herein, as mentioned previously. Integrated circuit U1 acts as a quasi-regulated voltage source, and provides a regulated −3 volts on circuit terminal E2 (−V) and an unregulated, approximately 9 volts on circuit terminal E1 (+V). Battery B1, which is preferably a 12 volt miniature battery, is coupled across terminals E1 and E2. Diode CR1 acts as a zener diode in a starved condition and provides approximately 3 volts as a reference voltage for integrated circuit U1. Potentiometer R28 provides an adjustment of the regulated −3 volts.

Integrated circuit U4 acts as a comparator. It triggers on a positive going pulse from integrated circuit U3, as will be explained, and latches up through hysteresis (i.e., feedback resistor R7) to cause LED CR3 (which is the visual alarm LED 8) to remain illuminated. The output of circuit U4 is coupled to the base of driver transistor Q1, whose emitter is coupled to LED CR3. LED CR3 is powered by an auxiliary 3 volt battery (or, as shown in FIG. 8, the series interconnection of two 1.5 volt batteries B2 and B3).

Separate 12 volt and 3 volt batteries are used in the monitor to provide a fail-safe measure. Since the LED CR3 draws the most current, that is, approximately 500 milliamps, if the LED fails due to a low battery, the rest of the circuit which is powered by the 12 volt battery B1 continues to operate to provide a warning to the user that high RF energy is present. Since the exposure light 8 (ex. batteries, the LED CR3) is powered from a separate battery (i.e., B2 and B3), maximum life is provided for the battery which powers the audible alarm 6. The battery B1 for the audible alarm is envisioned to last approximately 30 days in a "sleep" mode and 6 hours in a continuous alarm state. The exposure light 8 will last approximately 100 hours in a continuous lighted state.

Integrated circuit U2 is an operational amplifier configured as a conditioning amplifier with a gain of approximately 1,000. Potentiometer R27 is provided as a gain adjustment. The amplifier amplifies the signal from the radiation sensor which is coupled to circuit terminals E7 and E8, and amplifies that signal before providing it to integrated circuit U3.

Resistor R10, which is coupled to one leg of potentiometer R27, is a sensitor (i.e., a thermistor) and is provided to compensate for temperature variations so that conditioning amplifier U2 will provide more or less gain, as needed, as the temperature varies.

Integrated circuit U3 is a conventional circuit used in smoke detectors. Smoke detector circuit U3 provides a regulated voltage on its pin 1 which, in the case of the monitor circuit, is a 3 volt reference voltage to ground. Resistors R19 and R20 comprise a resistor network which preferably provides about a 1 volt alarm threshold on pin 2 of circuit U3. A standard piezo electric transducer 6 is coupled through terminals E4, E5 and E6 to pin numbers 8, 9 and 10 of circuit U3. As mentioned previously, a suitable transducer which may be used is Part No. PKM 11-6A0 manufactured by Murata-Erie Co.

Amplifier U2 has associated with it an auto-zero and temperature offset compensation circuit. The compensation circuit includes a pair of thermistors TH1, TH2 connected in a bridge configuration with bridge resistors R11, R12. The junction between thermistor TH2 and resistor R12 is provided with a negative voltage through resistor R14, and that junction and the junction of thermistor TH1 and resistor R11 are respectively coupled to the legs of potentiometer R26, whose wiper is connected to ground. The junctions between thermistor TH1 and resistor R12 and thermistor TH2 and resistor R11 are respectively connected to the opposite legs of potentiometer R25, whose wiper is coupled to the inverting input (Pin 2) of amplifier U2. Potentiometer R26 is adjusted at ambient temperature for zero voltage offset, and potentiometer R25 is adjusted for zero offset at the elevated temperature. Once adjusted, thermistors TH1, TH2 in the bridge configuration maintain the balanced temperature compensation. The bridge circuit is described in U.S. Pat. No. 4,605,905, which issued to the inventor on Aug. 12, 1986, the disclosure of which is incorporated herein by reference.

The circuit of the radiation monitor of the present invention operates in the following manner. The radiation sensor 40 generates preferably greater than 1 millivolt per 1 milliwatt per square centimeter of RF energy which illuminates it. This signal is carried by the transmission line 44 described previously to the inputs of conditioning amplifier U2. U2 amplifies the signal from the radiation sensor (that is, when the sensor is illuminated with 1 milliwatt per square centimeter of energy) by preferably 1,000 to provide an output signal which is preferably greater than 1 volt. This signal is provided to pin 3 of the smoke detector circuit U3. If the amplified signal from conditioning amplifier U2 is greater than the 1 volt threshold on pin 2 of circuit U3, the output of circuit U3 at pin 12 will provide a positive going pulse through diode CR2 to the non-inverting input (pin 3) of comparator U4.

In response to this pulse, the output of comparator U4, at pin 6, will go to a positive voltage and bias transistor Q1 on. Transistor Q1 will conduct current through LED CR3 to illuminate the LED of the radiation monitor. Hysteresis will keep comparator U4 latched until the circuit is reset.

Also, smoke detector circuit U3 sounds the piezo electric alarm 6 (FIG. 8) when the threshold is exceeded. Circuit U3 further monitors the battery voltage. When the battery voltage drops to approximately 7.5 volts, circuit U3 will cause the alarm to emit a chirp every 40 seconds. If the battery B1 drops further in voltage, the chirps emitted by the alarm 6 will become more frequent until a battery voltage is reached which causes the alarm to emit a continuous warble tone.

The monitor of the present invention further provides a self-test upon turn on. Capacitor C2, which is connected between the input (pin 3) of the conditioning amplifier U2 and the regulated 3 volt output of circuit U3 (at pin 1), is initially uncharged, thus providing a test voltage to be applied to the input (pin 3) of conditioning amplifier U2. Capacitor C2 is coupled to resistor R17 to ground to allow capacitor C2 to charge. This test voltage simulates the output signal generated by the detector circuit 66 when the sensor is illuminated with RF energy. The test voltage is amplified by circuit U2, and smoke detector circuit U3 sounds the alarm and causes comparator U4 to go to a positive state on its output, thereby turning on transistor Q1 and illuminating LED CR3. Comparator U4 is not latched under these test conditions. This is because capacitor C8, which is coupled between the regulated −3 volts and the positive supply voltage input (pin 7) of comparator U4 and one side of resistor R8 whose other side is connected to the unregulated 9 volt supply, is initially uncharged. Capacitor C8 prevents the positive supply voltage from being supplied to pin 7 of comparator U4. Circuit U4 will not latch up through hysteresis feedback resistor R7 under these conditions until capacitor C8 has become charged. At that time, however, capacitor C2 has become fully charged and effectively removes the test voltage from the input of conditioning amplifier U2. The output of amplifier U2 thereby falls below the 1 volt threshold, and the output signal from circuit U3 returns to a low level. This, in turn, causes the output signal of comparator U4 to return to a low logic level, thereby cutting off transistor Q1 and turning off warning LED CR3.

To ensure that the various capacitors and other components in the electronic circuitry of the monitor are fully discharged when the monitor is shut off, which thereby prevents false alarms as well as prevents comparator U4 from latching, a single pole, double throw switch is used as the on/off switch S1, as shown in FIG. 8. The positive side of battery B1 is coupled to one pole (S1-1) of the switch. The wiper terminal (S1-2) of the switch is coupled to the E1 terminal of the electronic circuit board. The E2 terminal is connected directly to the negative terminal of the battery and to the other pole (S1-3) of the switch. Accordingly, when the switch S1 is in the on position, wiper S1-2 contacts pole S1-1 to provide voltage from battery B1 across terminals E1 and E2.

The audible alarm 6, which may be a piezo ceramic horn, includes three leads, illustrated as blue, red and black, which are respectively connected to terminals E5, E4 and E6. The series interconnection of batteries B2 and B3 has its overall positive side connected to terminal E9 and its negative side connected to terminal E10.

When the switch is in the off position, wiper S1-2 contacts the opposite pole S1-3 and provides a short circuit across terminals E1 and E2. Because transistor Q1 remains cut off, when LED CR3 is not illuminated, negligible current is drawn from batteries B2 and B3 when the monitor is off.

Figure 7:
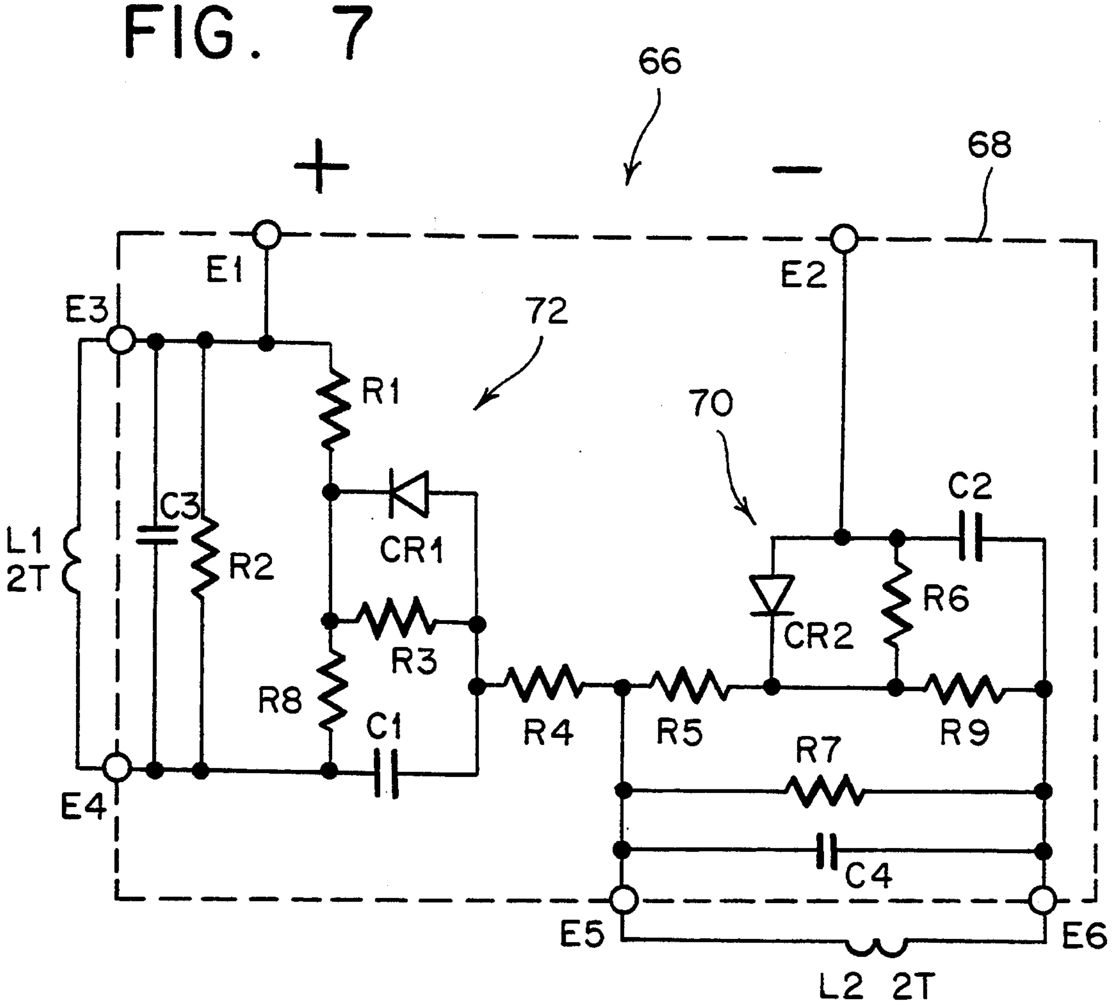
FIG. 7 is a schematic diagram of a first portion of an electronic circuit used in conjunction with the monitor of the present invention.

A parts list for the circuit shown in FIGS. 7 and 9 is provided below. Also, the pin numbers shown in FIG. 9 for integrated circuits U1–U4 relate to the parts specified in the list although, of course, it is envisioned that components comparable to those listed below, connected differently from that shown in FIG. 9, may be suitable for use.

PARTS LIST FOR CIRCUIT SHOWN IN FIG. 7

| Part Description | Reference Designation |
|---|---|
| COIL, 2 TURNS, .4 μH | L1, L2 |
| RESISTOR 33 OHMS | R2, R7 |
| RESISTOR 50 OHMS | R8, R9 |
| RESISTOR 65 OHMS | R1, R5 |
| RESISTOR 100K OHMS | R3, R6 |
| RESISTOR 30K OHMS | R4 |
| CAPACITOR 100 PF | C1, C2 |
| CAPACITOR 10 PF | C3, C4 |
| DIODE SCHOTTKY | CR1, CR2 |

PARTS LIST FOR CIRCUIT SHOWN IN FIG. 7

| Part Description | Reference Designation |
|---|---|
| TRANSISTOR 2N4124 | Q1 |
| WIRE, BUSS | W1 |
| CAPACITOR 22uf | C7-8 |
| CAPACITOR .1uf | C2, C3, C6 |
| CAPACITOR .01uf | C4, C5 |
| CAPACITOR .001uf | C1 |
| LIGHT EMITTING DIODE | CR3 |
| DIODE | CR2 |
| ZENER DIODE | CR1 |
| IC CHIP - CA3169A | U3 |
| IC CHIP - CA3078 | U1, U4 |
| IC CHIP - OP22EZ | U2 |
| CAPACITOR 1uf | C9 |
| POTENTIOMETER 1 MEG OHMS | R27, R28 |
| POTENTIOMETER 10K OHMS | R26 |
| POTENTIOMETER 25K OHMS | R25 |
| RESISTOR 2.4K OHMS | R32 |
| RESISTOR 360K OHMS | R9 |
| RESISTOR 62 OHMS | R23 |
| RESISTOR 3 MEG OHMS | R22 |
| RESISTOR 200K OHMS | R8 |
| RESISTOR 20 MEG OHMS | R31 |
| RESISTOR 300K OHMS | R9 |
| RESISTOR 6.2 MEG OHMS | R16 |
| RESISTOR 510K OHMS | R13–14, R20 |
| RESISTOR 10K OHMS | R11, R12 |
| SENSITOR 680 OHMS | R10 |
| RESISTOR 2 MEG OHMS | R7, 17, 29 |
| RESISTOR 3.3 MEG OHMS | R6 |
| RESISTOR 5.1 MEG OHMS | R21 |
| RESISTOR 820K OHMS | R2, R5 |

-continued

PARTS LIST FOR CIRCUIT SHOWN IN FIG. 7

| Part Description | Reference Designation |
|---|---|
| RESISTOR 1 MEG OHMS | R1, 3, 4, 19 |
| RESISTOR 56K OHMS | R24 |
| RESISTOR 100K OHMS | R30 |
| THERMISTOR | TH1, TH2 |

The radiation monitor of the present invention accurately detects RF radiation without being affected by body scattering caused by the wearer's body. The conductive shields 54, 58, i.e., either the absorbent material or the shield plates, positioned before and after the sensor loops L1, L2 cause the total current response of the sensor assembly 40 to be proportional to the magnitude of the electric field and relatively independent of frequency. It is envisioned that the sensor assembly and other features described previously may be used not only in a personal radiation monitor but also in a wall or ceiling mountable monitor to detect dangerous levels of electromagnetic radiation in a particular location.

Also, the radiation monitor is effective over a wide range of frequencies in the VHF RF spectrum, that is, from about 30 MHz to about 1000 MHz. The monitor provides accurate monitoring of electromagnetic radiation in these frequencies by measuring the more reliable magnetic fields in the lower portion of the VHF spectrum (i.e., below 300 MHz) and monitoring the electric field in the higher portion of the frequency spectrum, where the electric field is more accurate.

The compact size of the radiation monitor allows it to be worn on a belt using the clip 10 (FIG. 2) provided or in the wearer's pocket. Its broadband frequency performance and independence of polarization make the monitor perfectly adaptable for use in a variety of RF environments. The audible alarm 6 provides a warning of RF exposure, and the LED 8 provides a visual indication as well. The LED latches so as to provide a record that the wearer was exposed to RF energy, in the event the wearer did not hear the audible alarm before he left the danger zone.

The personal electromagnetic radiation monitor of the present invention is further quite suitable for use in high ambient noise environments. The ear plug assembly 22 includes ear plugs 32 which may be used in conjunction with ear phones, and is non-electrically conductive to prevent injury to the wearer and misreadings or damage to the electronic circuitry of the monitor. The detent and protrusion type connection used on the ear plug assembly and the housing of the monitor allows the user to quickly and easily connect the ear plug assembly 22 to the transducer 6 on the housing with no electrical connection required.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An electromagnetic radiation monitor, which comprises:

an electromagnetic radiation sensor, the electromagnetic radiation sensor including at least one coil, the at least one coil generating a signal in response to at least the electric field component of electromagnetic radiation sensed by the at least one coil, the magnitude of the signal generated by the at least one coil being substantially directly proportional to the frequency of the electric field component of the sensed electromagnetic radiation; and means positioned adjacent to the at least one coil for compensating for the frequency-dependent effect the electric field component has on the signal generated by the at least one coil, the compensating means having an impedance which varies substantially inversely proportional with the frequency of the sensed electromagnetic radiation, the at least one coil and the compensating means positioned adjacent thereto together defining a sensor assembly, the sensor assembly generating an output signal in response to at least the electric field component of the sensed electromagnetic radiation, the magnitude of the output signal of the sensor assembly being relatively independent of the frequency of the sensed electromagnetic radiation, wherein the at least one coil includes a first side and a second side, and wherein the compensating means includes a dipole formed as a strip of conductive material and positioned in alignment with the at least one coil in proximity to at least one of the first side and the second side of the coil.

2. An electromagnetic radiation monitor, which comprises: an electromagnetic radiation sensor, the electromagnetic radiation sensor including at least one coil, the at least one coil generating a signal in response to at least the electric field component of electromagnetic radiation sensed by the at least one coil, the magnitude of the signal generated by the at least one coil being substantially directly proportional to the frequency of the electric field component of the sensed electromagnetic radiation; and means positioned adjacent to the at least one coil for compensating for the frequency-dependent effect the electric field component has on the signal generated by the at least one coil, the compensating means having an impedance which varies substantially inversely proportional with the frequency of the sensed electromagnetic radiation, the at least one coil and the compensating means positioned adjacent thereto together defining a sensor assembly, the sensor assembly generating an output signal in response to at least the electric field component of the sensed electromagnetic radiation, the magnitude of the output signal of the sensor assembly being relatively independent of the frequency of the sensed electromagnetic radiation, wherein the electromagnetic radiation sensor includes a first coil and a second coil, the first coil and the second coil being disposed perpendicularly to each other; and wherein the compensating means includes a first dipole and a second dipole, each of the first and second dipoles being formed as a strip of conductive material, the strips being arranged mutually orthogonally, each of the first and second dipoles being positioned in proximity to and in alignment with a corresponding one of the first and second coils.

* * * * *